United States Patent
Hofmann et al.

(10) Patent No.: US 12,163,498 B2
(45) Date of Patent: Dec. 10, 2024

(54) SEALING SYSTEM FOR UNDERWATER TURBINE

(71) Applicant: AKTIEBOLAGET SKF, Gothenburg (SE)

(72) Inventors: Matthias Hofmann, Schweinfurt (DE); Michael Baumann, Gädheim (DE); Marcel Memmel, Ebenhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/530,365

(22) Filed: Dec. 6, 2023

(65) Prior Publication Data

US 2024/0200523 A1 Jun. 20, 2024

(30) Foreign Application Priority Data

Dec. 20, 2022 (DE) .......................... 102022214031.1

(51) Int. Cl.
*F03B 11/00* (2006.01)
(52) U.S. Cl.
CPC ......... *F03B 11/006* (2013.01); *F05B 2240/57* (2013.01)
(58) Field of Classification Search
CPC ............... F03B 11/006; F05B 2240/57; F16C 33/7896; F16C 33/7823
See application file for complete search history.

(56) References Cited

U.S. PATENT DOCUMENTS

| | | | |
|---|---|---|---|
| 11,022,176 B2 | 6/2021 | Delaby et al. | |
| 2014/0191508 A1 | 7/2014 | Schröppel et al. | |
| 2014/0346738 A1* | 11/2014 | Rusch .................... | F16J 15/004 29/401.1 |
| 2020/0011287 A1 | 1/2020 | Hofmann et al. | |
| 2022/0341543 A1 | 10/2022 | Kreutzkaemper et al. | |

FOREIGN PATENT DOCUMENTS

| | | |
|---|---|---|
| DE | 3718411 A1 | 12/1988 |
| DE | 102011016185 A1 | 10/2012 |
| DE | 102013008967 A1 | 11/2014 |

(Continued)

OTHER PUBLICATIONS

Unpublished U.S. Appl. No. 18/530,351, Marie-Joelle Huot-Marchand, filed Dec. 6, 2023.

(Continued)

*Primary Examiner* — Brian O Peters
(74) *Attorney, Agent, or Firm* — J-TEK LAW PLLC; Scott T. Wakeman; Mark A. Ussai (57) ABSTRACT

A sealing system for sealing a rotatable shaft of an underwater turbine against an entry of seawater includes a first seal support and a second seal support arranged axially adjacent to the first seal support along the shaft and a first seal element supported by the first seal support and a second seal element supported by the second seal support. The first and second seal elements each have an annular seal body and a lip extending from the seal body to a sealing surface on or rotationally fixed to the rotatable shaft, and at least one lubricant-filled chamber exists between the first and second seal supports and the shaft.

19 Claims, 4 Drawing Sheets

(56) References Cited

FOREIGN PATENT DOCUMENTS

EP 1223359 A1 7/2002
EP 3591245 A1 1/2020

OTHER PUBLICATIONS

Unpublished U.S. Appl. No. 18/530,379, Marie-Joelle Huot-Marchand, filed Dec. 6, 2023.
Unpublished U.S. Appl. No. 18/530,412, Marie-Joelle Huot-Marchand, filed Dec. 6, 2023.
European Search Report and Search Opinion from the European Patent Office dispatched May 8, 2024 in related application No. 23216747.8, and translation thereof.

* cited by examiner

SEALING SYSTEM FOR UNDERWATER TURBINE

CROSS-REFERENCE

This application claims priority to German patent application no. 10 2022 214 031.1 filed on Dec. 20, 2023, the contents of which are fully incorporated herein by reference.

TECHNOLOGICAL FIELD

The present disclosure relates to a sealing system for sealing off a shaft of an underwater turbine.

BACKGROUND

Underwater turbines, especially in maritime applications, for example in tidal energy plants, are usually sealed off against the surrounding water, especially seawater, with the aid of sealing systems. In particular, the bearing arrangements which connect the individual parts of the underwater turbine to each other in a movable manner must be reliably sealed off against entry of water. At the same time, seals must prevent external elements such as dust, abrasion, particles, water and marine species like plankton and algae from getting into the bearing arrangements and damaging its components. Particles can also get into the seals themselves and then reduce the seal service life.

Multiple adjacent seals are usually provided in order to create a redundant sealing system, wherein the lips of the adjacent seals can also be oriented in different directions.

However, the pressures prevailing in the water exert large forces on seals and sliding surfaces in contact with them so that mutual wear and tear occurs on these components within a brief time, and this may impair a sealing effect. Here, a replacement may be costly in terms of time and/or money, and such replacement may not be possible at all times under certain circumstances.

In particular, the seals cannot be replaced under water under certain circumstances. Thus, such servicing processes may be costly and require that the underwater turbine be shut down often and for a lengthy period of time.

SUMMARY

Therefore, a problem addressed by the present disclosure is to provide a sealing system for an underwater turbine in which the wear on the seals is lessened.

In the following, a sealing system is disclosed for an underwater application, especially a maritime application. The scaling system is designed in particular for sealing off a rotatable component, such as a shaft of an underwater turbine, in particular an underwater turbine of a tidal energy plant, wherein the scaling system comprises multiple ring-shaped seal supports that are arranged adjacent to each other. Each seal support carries at least one seal element having a ring-shaped seal body and at least one sealing lip extending from the seal body, wherein the seal body is fastened to the seal support, and the scaling lip extends in the direction of the shaft to be sealed. The seal element itself is preferably a seawater (saltwater) seal, i.e., a seal element suitable to seal off against seawater. Furthermore, the sealing lip has a running surface by which the sealing lip contacts a mating surface formed directly or indirectly on the rotatable component. The mating surface can be formed directly by the rotatable component itself, i.e., the shaft for example, or indirectly by a contacting element, such as a contacting sleeve, which is fastened in a rotationally fixed manner on the rotatable component.

In order to minimize wear on the sealing system and also wear on the mating surface, a free space is provided between the seal support and the rotatable component that forms a chamber in which a lubricant is contained. For this, the seal support can have a cutout, open in the direction of the shaft, for example, which forms the chamber. The lubricant contained in the chamber here ensures that there is less friction between the sealing lip and the mating surface, which in turn reduces the wear. Furthermore, the lubricant serves as corrosion protection for the inner seal support rings. The lubricant is preferably a solid grease. According to another preferred exemplary embodiment, furthermore, at least the sealing lip, preferably the entire seal element is made from a material having friction-reducing properties. In particular, the sealing lip can be made from a material in which a solid lubricant is embedded or from a material which itself is a solid lubricant. It is likewise possible to apply a friction-reducing material on the sealing lip, especially on the running surface, for example by means of an appropriate coating. In this way, a friction-reduced sealing system can be provided, which affords a friction-reduced sealing even without the presence of lubricant, for example, after the lubricant has been used up or become aged.

In another preferred exemplary embodiment, a cutout open in the direction of the rotatable component is configured on the seal support, wherein the cutout forming the chamber is dimensioned and arranged such that a free space remains between a side of the sealing lip facing away from the running surface and the seal support, forming the chamber which can be filled with lubricant. Here, it is especially preferable for the cutout to be formed as a sealing lip receiving cutout, which surrounds and contains a sealing lip, wherein the free space between the sealing lip and the cutout forms the chamber. This configuration allows the lubricant to intensify the sealing effect of the sealing lip, since it increases the contact pressure of the sealing lip on the mating surface. Likewise, this configuration ensures that the water pressure on the first sealing lip, which seals off against water, is equalized by the lubricant pressure, which in turn ensures a reduction in the wear.

In order to further reduce wear in this configuration, it can moreover be provided that lubricant is also provided on the same side of the running surface of the sealing lip so that the sealing lip is not further exposed to pressure in terms of the lubricant. In this preferred exemplary embodiment, the lubricant introduced serves as an additional barrier to the entry of seawater since the water must additionally displace the lubricant in order to get into and through the sealing system.

According to another preferred exemplary embodiment, the seal support has at least one, preferably radial, through-borehole, which is fluidically connected to the chamber. By this through-borehole, lubricant can be introduced into the chamber. Moreover, the borehole can be used to remove water which has penetrated into the sealing system. Furthermore, the borehole can be used to test the sealing ability of the sealing lip after installing the sealing system in the underwater turbine. For this, a vacuum can be applied to the through-borehole, or a test fluid can be introduced, in order to test for tightness with low pressure or excess pressure.

It is likewise advantageous to arrange a sensor in the through-borehole or in the chamber, which detects entry of water into the chamber or into the borehole and can preferably relay this to a monitoring system.

Furthermore, it is preferable for the seal support to have two radial through-boreholes, which are fluidically connected to the chamber, the two radial boreholes being arranged offset from each other, preferably by 180°. Since the sealing system is usually designed to provide total sealing, air which must escape into the chamber when the lubricant is introduced cannot escape through the sealing system, or only do so with difficulty. By providing a second borehole, the air displaced by the lubricant can be removed from the sealing system so that the chamber and also the through-boreholes are filled with lubricant. The preferred 180° arrangement moreover here assures that the lubricant can spread evenly and bubble-free in the chamber and in the boreholes.

According to another preferred exemplary embodiment, the radial borehole comprises a first radially outer thread and a second radially inner thread, wherein the first thread has a larger diameter than the second thread. Such a configuration allows a redundant closure possibility for the borehole so that it can be assured that no water can penetrate through the borehole into the sealing system. It is especially preferable here for the second thread to be designed to receive a, preferably conical, grub screw, which is received in a sealing manner in the thread, while the first thread is closed with a plug which can be screwed tight.

According to another preferred exemplary embodiment, each seal support further comprises at least one seal body receiving cutout that is designed to receive the seal body of the seal element in a rotationally fixed manner. This is preferably configured to be open toward one end face of the ring-shaped seal support and has an axial depth which is less deep than the design height of the seal body. If an elastomer seal body is provided, this can have the result that the elastomeric deformation upon installing the sealing system presses the bearing surfaces of the seal body tightly against the bearing surfaces in the cutout of the seal support and against an adjacent element. In this way, a static sealing can be additionally achieved between the seal supports.

Alternatively or additionally, the seal support can furthermore have at least one ring-shaped groove on at least one end face, which is designed to receive a static seal, especially an O-ring seal.

Preferably, the seal body receiving cutout and the sealing lip receiving cutout are arranged spaced apart from each other axially at two axial ends of the seal support. This enables a preferred configuration in which the sealing lip receiving cutout is designed to receive the sealing lip of a seal element carried by an adjacently arranged seal support.

It is furthermore preferable here for the cutout to be configured so as to provide a supporting effect for the sealing lip and a radial bracing for the seal body. The supporting effect for the sealing lip here ensures that the sealing lip cannot "flip over" on account of the pressure acting on it. The bracing for the seal body enables a bracing or supporting of the seal body directed radially in the direction of the rotating component. For this, appropriate support elements can be formed on the seal support.

According to another preferred exemplary embodiment, at least one seal support comprises, preferably radially inwardly, a ring-shaped axially protruding projection, which is designed to enter into engagement with a complementarily configured ring-shaped axial notch of an adjacently arranged seal support. In this way, a self-centering of the individual seal supports can be achieved. Furthermore, the engaging of the projection with the notch constitutes a further impediment to entry of water.

It is especially preferable here for the ring-shaped projection to define an axial depth of a circumferential bearing surface of the seal body receiving cutout for a radially outer lateral surface of the ring-shaped seal body.

According to another preferred exemplary embodiment, the at least one seal support has multiple circumferentially distributed fastening boreholes, preferably provided with a thread, at its radially outer margin region, which are designed to receive a fastening means for securing the seal support and/or a forcing screw for disassembling the seal support. Since, because of the large tightening pressure which is needed for the seal support and its mating fastening part to bear against each other in as watertight a manner as possible, and because of fouling and possible corrosion, the two parts after lengthy use may be "baked onto" each other, they often cannot be loosened from each other without damage, in order for example to service a sealed bearing or replace the sealing system as a whole. The option of inserting a forcing screw into the seal support makes it possible that the seal support is pressed away from the mating part and thus can be easily disassembled.

If multiple seal supports are provided, having multiple circumferentially distributed fastening boreholes at their radially outer margin regions, it is furthermore preferable for the seal supports to have different outer diameters, wherein the outer diameters are dimensioned such that the fastening boreholes arranged in the radially outer margin region are freely accessible in the installed state of the sealing system. In this way the accessibility and replaceability of individual parts of the sealing system can be achieved without having to dismantle the entire sealing system from the stationary component. In this way, the scaling system can also be serviced under water.

Furthermore, an exemplary embodiment is advantageous in which the sealing system comprises a seal support formed as a fastening seal support, the fastening seal support being designed to be fastened to a stationary component of the tidal plant, especially to a bearing ring of a bearing unit supporting the shaft to be sealed or to a housing receiving the bearing unit. It is furthermore advantageous for the fastening seal support to have at least one ring-shaped groove at an end face facing toward the stationary component that is designed to receive a static seal, especially an O-ring seal. In this way, it can be assured that water also cannot bypass the sealing system into the underwater turbine.

Preferably here as well a second ring-shaped groove is provided, arranged radially within the first groove and likewise designed to receive a static seal, especially an O-ring seal. In this way, a redundancy can also be created at this site to be sealed, reliably preventing water from being able to get into the underwater turbine.

According to another preferred exemplary embodiment, a borehole is provided in the fastening seal support, the borehole including a first radially extending borehole portion and a second axially extending borehole portion, wherein the axially extending borehole portion extends from the first borehole portion to the end face facing toward the stationary component so that the second borehole portion opens out in the end face radially inside the first and preferably radially outside the second ring-shaped groove. This borehole, like the already mentioned boreholes fluidically connecting the chamber, can be used to examine the static seal for its sealing ability. For this, a test fluid can also be introduced into this borehole, being subjected for example to a predetermined pressure at which the static seal at least is to seal.

According to another preferred exemplary embodiment, the fastening seal support has multiple circumferentially distributed fastening boreholes, preferably provided with a thread, at its radially outer margin region, which are designed to receive a fastening means for securing the fastening seal support on the stationary component and/or a forcing screw for disassembling the fastening seal support from the stationary component. Since, because of the large tightening pressure which is needed for the fastening seal support and the stationary component to bear against each other in as watertight a manner as possible, and because of fouling and possible corrosion, the two parts after lengthy use may be "baked onto" each other, they often cannot be loosened from each other without damage, in order for example to service a sealed bearing or replace the sealing system as a whole. The option of inserting a forcing screw into the fastening seal support makes it possible that the seal support is pressed away from the stationary component and thus can be easily disassembled.

Furthermore, it is preferable that the fastening seal support has an outer diameter which is larger than the outer diameters of the other seal supports, wherein preferably the outer diameters are dimensioned such that the fastening boreholes arranged in the radially outer margin region are freely accessible in the installed state of the sealing system. In this way, the sealing system can be secured as a complete unit on the stationary component and be disassembled once again, without having to take the sealing system apart into its individual pieces. This also makes it possible that the sealing system can be examined for its scaling ability prior to the installation.

Furthermore, the sealing system preferably comprises a seal support configured as a covering seal support on the side facing away from the fastening seal support and thus on the side facing away from the stationary component, i.e., toward the surrounding water, wherein the covering seal support is designed to cover the sealing system with respect to an outer circumference. This covering seal support can have only a particle seal instead of a seawater seal, which particle seal is configured to prevent outside elements, such as dust, abrasion, particles and marine species such as plankton and algae, from getting into the sealing system.

Similar to the fastening seal support, the covering seal support can preferably also have multiple circumferentially distributed fastening boreholes, preferably provided with a thread, at its radially outer margin region, which are designed to receive a fastening means for the fastening of the fastening seal support on an adjacent or a further seal support and/or a forcing screw for the disassembly of the covering seal support from the adjacent seal support.

Advantageously, the covering seal support has an outer diameter which is smaller than the outer diameters of at least one other seal support. In this way, it can be assured that the covering seal support in the installed state does not restrict the access to the other seal supports.

According to another preferred exemplary embodiment, at least one first seal support and one second further seal support are provided between the fastening seal support and the covering seal support, the first seal support being arranged adjacently to the fastening seal support, and the second seal support being arranged adjacently to the covering seal support. A sufficient redundancy can be created in this way so that even upon failure of one seal element there are other seal elements present which prevent water from getting into the underwater turbine. The number of further seal supports may depend on the use environment. For example, the number of sealing lips is thus dependent on the anticipated water pressure and/or service life.

Similar to the fastening seal support and the covering seal support, it is likewise advantageously provided that the first seal support has multiple circumferentially distributed fastening boreholes, each preferably provided with a thread, preferably at its radially outer margin region, which are designed to receive a fastening means for the fastening of the first seal support at the fastening seal support and/or a forcing screw for the disassembly of the first seal support from the fastening seal support and/or the second seal support has multiple circumferentially distributed fastening boreholes, preferably provided with a thread, preferably at its radially outer margin region, which are designed to receive a fastening means for the fastening of the second seal support at the first seal support and/or a forcing screw for the disassembly of the second seal support from the first seal support.

Alternatively, it can also be provided that the second seal support has no screw fastening of its own, but rather the fastening openings are designed to receive the fastening means of the covering seal support so that the second seal support and the covering seal support are screwed together on the fastening seal support. The possibility of screwing in a forcing screw can also be provided in this exemplary embodiment separately for the second seal support.

As mentioned above, this allows on the one hand for the sealing system to be able to be mounted as one unit on the stationary component, but on the other hand it also allows for individual parts of the sealing system to be able to be replaced, without having to dismantle the entire sealing system from the stationary component. In this way, the sealing system can also be serviced under water.

According to another preferred exemplary embodiment, at least the first seal support has an outer diameter which is greater than the outer diameter of the second seal support, wherein preferably the outer diameters are dimensioned such that the fastening boreholes arranged in the radially outer margin region are freely accessible in the installed state of the sealing system. Also in this way the accessibility and replaceability of individual parts of the sealing system can be achieved, without having to dismantle the entire sealing system from the stationary component. In this way, the sealing system can also be serviced under water.

If the second seal support and the covering seal support are designed to be able to be installed together, it is advantageous for their outer diameters to be equal.

As mentioned above, the sealing lips of the sealing system make contact on a mating surface. This mating surface can be formed by the rotatable component itself, but since the contacting of the sealing lips may cause wear, especially a formation of grooves on the mating surface, it is preferable to employ a contacting sleeve, especially for the sealing of shafts, which is mounted in a non-rotatable manner on the rotatable element, especially on the shaft.

In this case, one exemplary embodiment is advantageous in which the contacting sleeve is press-fitted on the shaft. The advantage of the press-fitting is that the contacting sleeve can be much more economical in terms of space, since a flange for securing the sleeve can be dispensed with. Moreover, it can be achieved thereby that the costs incurred are lower, since a material- and labor-intensive design with flange and screws can be dispensed with.

In order to seal off the underwater turbine against a water ingress also along the contacting sleeve, the contacting sleeve can preferably have at least one ring-shaped groove on its inner lateral surface that is designed to receive a static seal, especially an O-ring seal. Preferably, a second ring-shaped groove is also provided here, being offset axially in the direction of the stationary component as compared to the first groove, being likewise designed to receive a static seal, especially an O-ring seal. In this way, a redundancy can also be created at this site to be sealed that reliably prevents water from being able to get into the underwater turbine.

The contacting sleeve can be axially displaceable so that the sealing lips after a servicing make contact with an axially offset site. In this way, it can be achieved that the contacting sleeve does not need to be removed completely from the shaft or the rotatable component, which is a time-consuming and complicated maintenance work.

In order to facilitate the axial displaceability for the press-fitted contacting sleeve, a borehole is furthermore provided in the contacting sleeve that has a first axially extending borehole portion and a second radially extending borehole portion, wherein the radially extending borehole portion extends from the first borehole portion to the inner lateral surface so that the second borehole portion in the installed state opens out between the stationary components and the ring-shaped groove, preferably between the first and second ring-shaped groove, into the inner lateral surface. The opening is preferably arranged here centrally in the contacting sleeve. A lubricant, especially an oil, can be introduced into this borehole for the axial displaceability, which collects on the contact surface between the contacting sleeve and the rotatable component and facilitates the axial displaceability.

At the same time, this borehole can also be used to test the sealing ability of the static seal. For this, as already described above, a test fluid can be introduced, being subjected for example to a predetermined pressure at which the static seal is supposed to seal off at each instance.

According to another preferred exemplary embodiment, the contacting sleeve has at least one second borehole with a first axially extending borehole portion and a second radially extending borehole portion, wherein the radially extending borehole portion extends from the first borehole portion to the outer lateral surface. This second borehole is fluidically connected to one of the lubricant-receiving chambers of the sealing system. Through this through-borehole, lubricant can also be introduced via the contacting sleeve into the chamber. Moreover, the borehole can be used to remove water which has penetrated from the sealing system. Furthermore, the borehole in the contacting sleeve can also be used to test the sealing ability of the sealing lip after the sealing system has been installed in the underwater turbine. For this, a vacuum can be applied for example at the through-borehole, or a test fluid can be introduced.

It is likewise advantageous if a sensor is arranged in the through-borehole or in the chamber, which detects entry of water into the chamber or into the borehole and can preferably relay this to a monitoring system.

Similar to the seal support, it is also preferable in the contacting sleeve for the contacting sleeve to have two second through-boreholes that are fluidically connected to the chamber, the two second boreholes being arranged offset from each other, preferably by 180°. Since the sealing system is usually designed to provide total sealing, air which must escape into the chamber when the lubricant is introduced may not escape through the sealing system, or only do so with difficulty. By providing an offset borehole, the air displaced by the lubricant can be removed from the sealing system so that the chamber and also the through-boreholes are filled with lubricant. The preferred 180° arrangement moreover assures that the lubricant can spread easily and in a bubble-free manner in the chamber and in the boreholes.

Furthermore, an exemplary embodiment is advantageous in which all chambers of the sealing system are connected by boreholes in the contacting sleeve for introducing a lubricant or a test fluid or for applying a vacuum, in which case no boreholes are provided in the seal supports. In this exemplary embodiment, an inlet and an outlet can also be provided each time—i.e., a further centrally axial borehole with corresponding branches, offset preferably by 180°.

According to another preferred exemplary embodiment, the at least one borehole in the contacting sleeve comprises a first axially outer thread and a second axially inner thread, wherein the first thread has a larger diameter than the second thread. Such a configuration allows a redundant closure possibility for the borehole so that it can be assured that no water can get in through the borehole into the sealing system. It is especially preferable here for the second thread to be designed to receive a, preferably conical, grub screw, which can be screwed tightly into the inner second thread, while the first thread is closed by a tight plug that can be screwed in.

According to another preferred exemplary embodiment a sealing system for sealing a rotatable shaft of an underwater turbine against an entry of seawater includes a first seal support and a second seal support arranged axially adjacent to the first seal support along the shaft, and a first seal element supported by the first seal support and a second seal element supported by the second seal support. The first and second seal elements each include an annular seal body and a lip extending from the seal body to a sealing surface on or rotationally fixed to the rotatable shaft. At least one lubricant-filled chamber is defined between the first and second seal supports and the shaft. Furthermore, a first axial direction along the shaft is a forward direction and a second axial direction opposite the first axial direction is a rearward direction. The first seal support includes a forward surface and a cutout in the forward surface in which the seal body of the first seal element is mounted and a projection extending forward from a radially inner portion of the cutout having a radially outer conical surface extending between a portion of the lip of the first seal element and the rotatable shaft. The second seal support includes a rear surface abutting the forward surface of the first seal support, a projection extending rearward and supporting a radially inner portion of the seal body of the first seal element, and a cutout facing the lip of the seal element of the first seal support and with the lip of the seal element of the first seal support at least partially defining a first one of the at least one lubricant-filled chamber. The second seal support may also include a forward surface and a cutout in the forward surface of the second seal support in which the second seal body is mounted and a projection extending forward from a radially inner portion of the cutout of the second seal support having a radially outer conical surface extending between a portion of the lip of the second seal element and the rotatable shaft. The system may also include a third seal support having a rear surface abutting the forward surface of the second seal support and a projection extending rearward and supporting a radially inner portion of the seal body of the second seal element and a cutout facing the lip of the seal element of the second seal element and defining with the lip of the seal element of the second seal support a second one of the at least one lubricant-filled chamber. A fourth seal support may be located between the first seal support and a housing or bearing ring surrounding the shaft.

According to another preferred exemplary embodiment, a sacrificial anode is furthermore attached on the sealing system, especially on the covering seal support, which protects the sealing system against corrosion.

It is especially preferable here for the sacrificial anode to be mounted on the optionally attached contacting sleeve and/or on the covering seal support. The sacrificial anode can also be mounted across a spacing element on the contacting sleeve, in which case the spacing element reduces a spacing from another part arranged on the shaft, such as a rotor or a rotor blade, and thus ensures that the axial displaceability of the contacting sleeve is axially limited. It can thus be assured in the case of the press-fitted contacting sleeve that the contacting sleeve also does not shift on the shaft due to ageing effects, such as a material and age-related broadening.

The sealing system can be installed at various points of the underwater turbine. Especially preferably, it can be installed on a pivot system (pitch) for adjusting the rotor blade position, for a main shaft seal between the rotor shaft and the nacelle, and/or on a pivot system (yaw) for rotating the nacelle.

The bearing units which mount the rotatable component, especially the shaft, and which can be sealed off with the aid of the sealing system, can be roller bearings or sliding bearings. Likewise, they can form a rotary connection for the turning of the rotor blade or the nacelle.

According to one preferred exemplary embodiment, the sealing system is installed on the pivot system for the rotor blades mounted on a rotor hub. It is especially advantageous here when the bearing arrangement is configured not as a pivot bearing with a massive and large-sized bearing outer ring, but instead is configured as a bearing arrangement having two bearing units spaced apart from each other. The rotor hub here serves as a bearing housing and the sealing system is mounted directly on the rotor hub and not, as in the prior art, on the bearing outer ring of the pivot bearing. Although the rotor hub itself is not a stationary part here, the rotor hub is stationary in respect of the rotation of the rotor blade, however. The shaft bearing can be formed for example as a combination of a loose and a fixed bearing or as a combination of two engaged tapered roller bearings.

A further aspect of the present disclosure relates to a bearing arrangement for an underwater turbine, especially in a tidal plant, comprising a sealing system described above.

Yet another aspect of the disclosure relates to an underwater turbine having a sealing system described above.

Further benefits and advantageous configurations are indicated in the specification, the drawings, and the claims. In particular, the combinations of features indicated in the specification and in the drawings are merely exemplary here so that the features can also be present by themselves or in another combination.

In the following, the disclosure will be described more closely with the aid of exemplary embodiments presented in the drawings. The exemplary embodiments and the combinations shown in the exemplary embodiments are merely exemplary here and shall not establish the scope of protection of the disclosure. This will be defined solely by the appended claims.

DETAILED DESCRIPTION

In the following, the same or functionally equivalent elements are identified by the same reference numbers.

FIGS. 1 to 4 show different cross sectional views through different sectioning planes of a preferred exemplary embodiment of a sealing system 100 for sealing a rotatable component of an underwater turbine. The disclosed sealing system 100 is configured to seal a bearing of a rotatable rotor blade. But the sealing system 100 can be used for all seals, for example likewise a rotor shaft main bearing or a bearing for rotation of a nacelle.

In the exemplary embodiment represented in the figures, the sealing system 100, as mentioned above, is designed for mounting a rotor blade shaft 2 on which rotor blades 4 are fastened in a rotationally fixed manner. The rotor blade shaft 2, in turn, is rotatably mounted in a rotor hub 6, with bearing arrangements 8 being provided for the mounting. Roller bearings or sliding bearings can be used as the bearing units. The bearing units 8 shown here schematically as roller bearings are to be viewed merely purely schematically as placeholders for any given types of bearing.

The sealing system 100 in turn comprises multiple ring-shaped seal supports 20-1, 20-2, 20-3, 20-4. Each seal support 20 is designed to carry at least one dynamic seal element 30, and the seal elements 30 are arranged in corresponding seal body receiving cutouts 21 formed on the respective seal supports 20.

Figure 1:
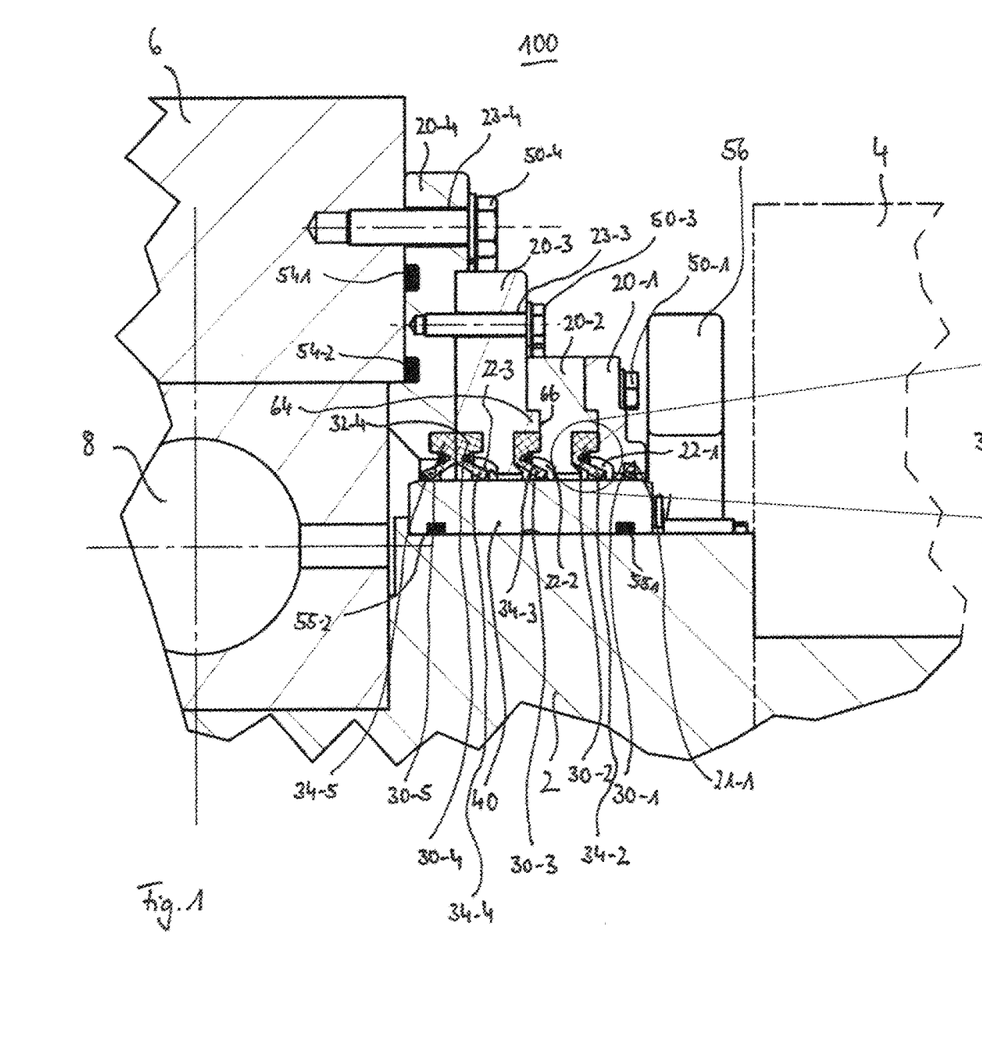
FIG. 1 is first cross sectional view through a sealing system according to a first embodiment of the present disclosure.
Figure 1A:
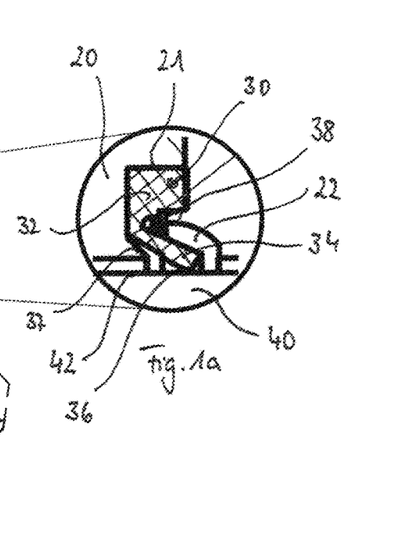
FIG. 1a is an enlarged detail of a portion of FIG. 1.

The dynamic seal elements 30 each have a seal body 32 and a sealing lip 34, as can be seen from the detail view of FIG. 1a, and the seal body 32 is ring-shaped and is received in the cutout 21, while the sealing lips 34 extend radially inward in the direction of the shaft 2. Furthermore, the seal elements 30 have a running surface 36 by which the seal elements make contact on a mating surface 42. The mating surface 42 in this exemplary embodiment shown is formed by a contacting sleeve 40, but it could also be the case that the sealing lips 34 lie directly against the shaft 2.

Furthermore, FIG. 1a shows that the seal supports 20 comprise a first support element 37 and a second support element 38, which are designed to support and carry the sealing lip 34 and the seal body 32, respectively. For this purpose, the support element 37 is designed to brace the sealing lip 34 and to ensure that the sealing lip 34 does not "flip over", i.e., bend over in the direction of the side to be sealed, even under a high water pressure on the sealing lip. The support element 38 serves to resist radially inward movement of the seal body 32 and thus creates together with the adjacent seal support a tight receiving space for the seal body 32 so that the seal body 32 is received free of rotation and statically sealing in the sealing system.

In order to form the most compact possible sealing system, sealing lip receiving cutouts 22 are formed on the seal supports that can receive a sealing lip 34 of a seal element 30 carried by the seal support itself (see seal support 20-3 and 20-4) or a sealing lip of a seal element carried by an adjacent seal support (see seal support 20-1 and 20-2).

As can be seen furthermore from the exemplary embodiment, various dynamic seal elements 30 are provided in the sealing system, fulfilling various sealing tasks. Thus, the seal element 30-1 is configured as a particle seal for preventing impurities from entering the sealing system 100. The seals 30-2, 30-2, 30-4, on the other hand, are configured as so-called seawater seals and have sealing lip geometries and materials which ensure that water is prevented from entering the rotor hub 6. For this, the sealing lips 34 of the seawater seals 30-2, 30-2, 30-4 point in the direction of the rotor blade 4.

The seal element 30-5, on the other hand, serves for holding lubricant, used in the bearing unit 8, in the bearing unit 8 and preventing it from exiting the bearing unit into the sealing system 100. For this reason, the sealing lip 34-5 of the seal element 30-5 points in the direction of the bearing unit 8. The seal body receiving cutout 21 can be configured as a groove 21-1, as shown in the seal support 20-1, but it can also be configured as a cutout open toward the end face, as shown in the seal supports 20-2 to 20-4. The seal support 20-1 in the exemplary embodiment shown is a covering seal support, while the seal support 20-4 is configured as a fastening seal support, being fastened directly to the rotor hub 6 in the exemplary embodiment shown. Depending on the configuration of the bearing unit 8, the fastening seal support can also be fastened directly to a bearing ring.

As mentioned above, the seal supports 20-1, 20-2, 20-3 comprise cutouts 22-1, 22-2, 22-3, which are designed to receive their own or an adjacent sealing lip 34. In the exemplary embodiment shown, the sealing lip 34-2 of the second seal element 30-2 is received in the cutout 22-1, and the sealing lip 34-3 of the seal element 30-3 carried by the third seal support 20-3 is received in the cutout 22-2.

The cutouts 22-3 and 22-4, on the other hand, are designed to receive sealing lips of a seal element carried by the same seal support. Thus, the seal support 20-3 carries both the seal body 32-4 of the seal element 30-4 and at the same time has a cutout 22-3 in which the sealing lip 34-4 of the same seal element 30-4 is received. The same holds for the seal support 20-4.

Figure 2:
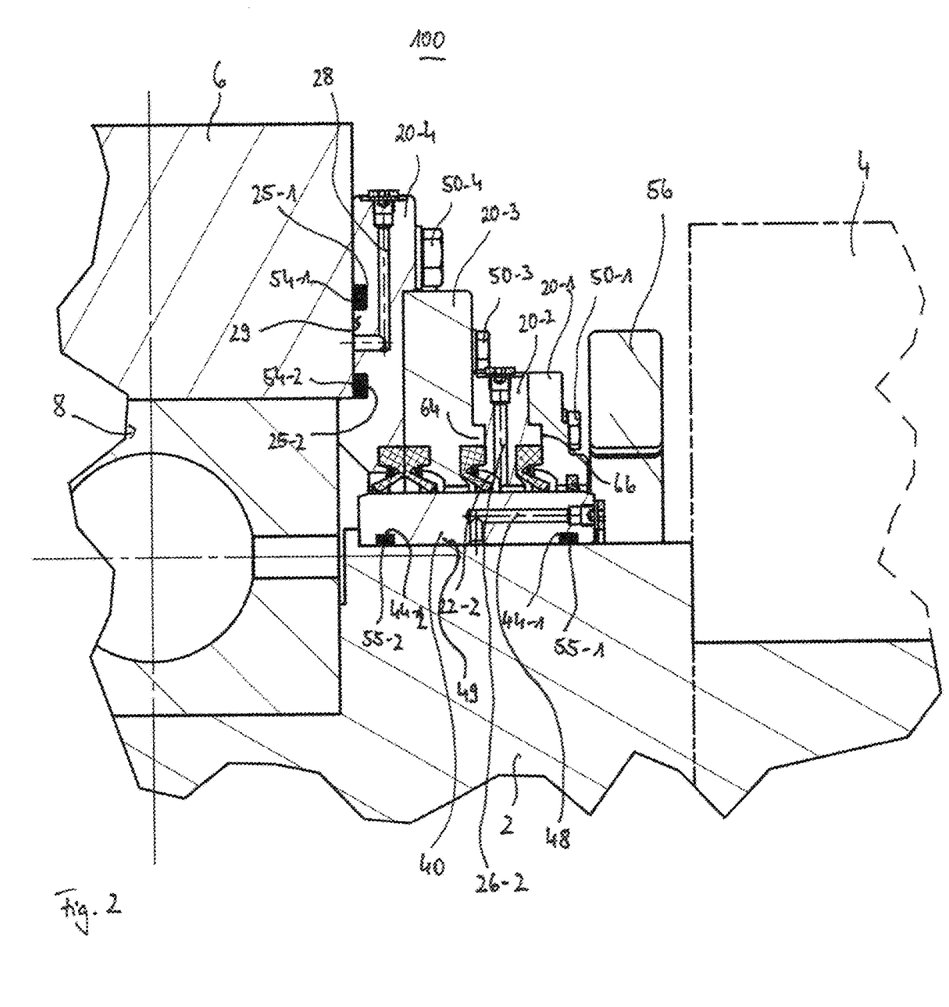
FIG. 2 is a second cross sectional view through the sealing system of FIG. 1.
Figure 3:
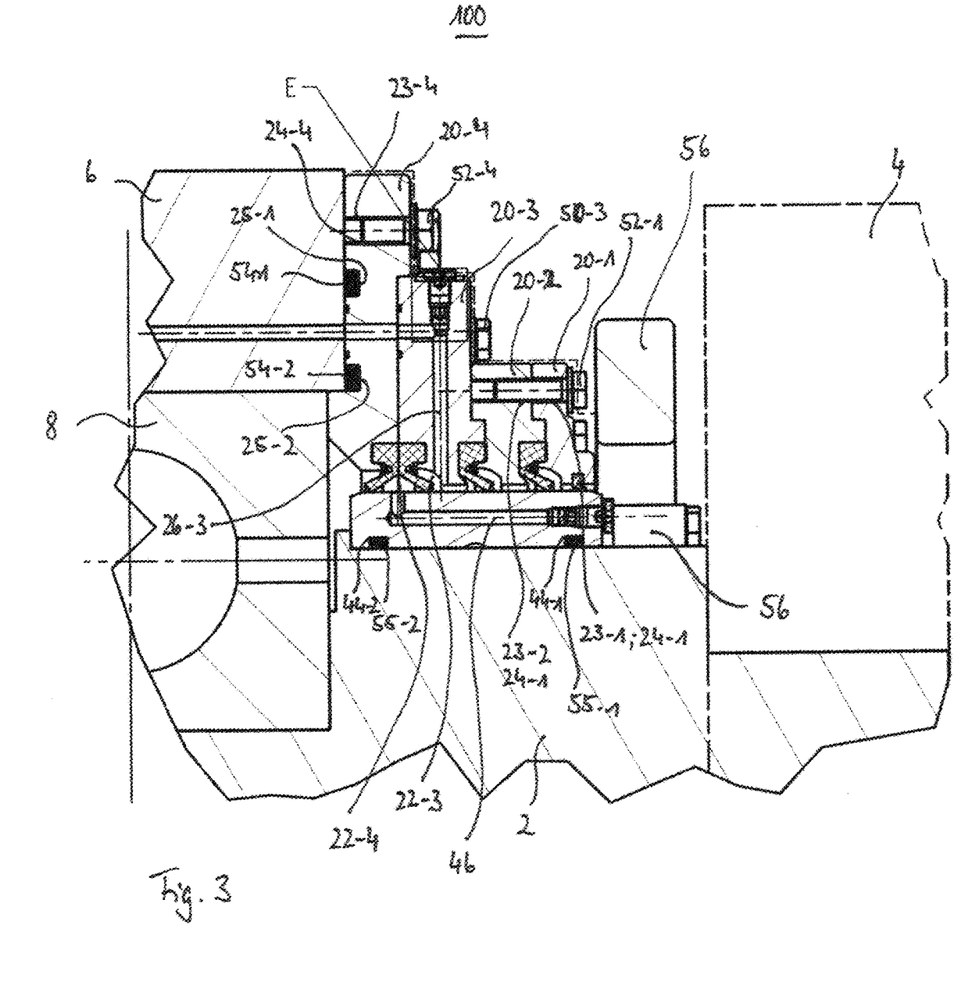
FIG. 3 is a third cross sectional view through the sealing system of FIG. 1.

In the exemplary embodiment shown in FIGS. 1-3 it can furthermore be seen that fastening boreholes 23 are provided on the seal supports 20 in a radially outer margin region. The fastening boreholes here are designed such that they are designed either for receiving a fastening means, especially a screw 50 (see FIG. 1 and FIG. 2) or a so-called forcing screw 52 (see FIG. 3). For this, a thread 24 can be provided in the opening, but it is also possible for the opening to be a smooth borehole. Preferably, no thread is provided in the fastening boreholes 23 provided to receive a screw 50, but rather only in the fastening boreholes 23 which serve to receive the forcing screw 52.

In the cross sectional view shown in FIG. 2, only the covering seal support 20-1 and the fastening seal support are equipped with a forcing screw 52. But this can also be provided on the seal supports 20-2 and 20-3 arranged in between.

The forcing screws 52 serve for disassembling the respective seal support 20 from its fastening partner, in the case of the rotor hub 6 or the seal supports 20-3. Since, after a certain period of time, the connection between the seal supports 20 and their respective fastening partner is so strong, disassembly of the seal support rings for maintenance purposes is often not possible without damage. With the aid of the forcing screws 52, however, the seal support 20 can be loosened from the respective fastening partner without damage. In this case, the forcing screw 52 is screwed into the thread 24, wherein the forcing screw 52 itself has a longer axial length than the seal support 20 itself so that the forcing screw 52 abuts against the respectively other fastening partner and upon further tightening pushes the seal support 20 away from the respective fastening partner.

Furthermore, it can be seen from the figures that the seal support 20-2 is screwed with the aid of the covering seal support 20-1 on the adjacent seal support 20-3. Of course, however, it would also be possible to screw on the seal support 20-2 by itself. Furthermore, it can be seen from the exemplary embodiment that the fastening boreholes are provided in a radially outer margin region of the seal supports 20. It should be noted moreover that the seal support 20-2 and the seal support 20-3 also can be screwed not only on the adjacent seal support 20-3 and 20-4, respectively, but also can be fastened to a further element across one or more seal supports. The configuration represented here has the benefit, however, that the sealing system 100 can be screwed as a prefabricated unit directly onto the rotor hub 6.

Furthermore, it can be seen from the figures shown that the fastening seal support 20-4 has the greatest outer diameter and the adjacent seal supports 20-3 or 20-2 and 20-1 exhibit a smaller outer diameter. In this way, the fastening boreholes 23 which are arranged in the radial outer region in the respective seal supports 20 can also be freely accessible in the installed state. Similar to the fastening seal support 20-4, the adjacent seal support 20-3 is also designed moderately larger in outer diameter than the adjacent seal support 20-2.

The seal support 20-2 and the covering seal support 20-1 have the same outer diameter in the exemplary embodiment shown and are fastened together on the first seal support 20-3. Of course, it would likewise be possible here to also provide a stepwise arrangement between the second seal support 20-2 and the covering seal support 20-1 and also to fasten the seal support 20-2 separately yet again on the seal support 20-3.

Furthermore, FIGS. 1-3 show that, for a sealing off between the rotationally fixed connected elements, namely between the fastening seal support 20-4 and the rotor hub 6, or between the contacting sleeve 40 and the shaft 2, static seals 54, 55 are arranged in the form of O-rings, for example. For this, the fastening seal support 20-4 has ring-shaped grooves 25 in which O-rings 54 can be installed. Likewise, the contacting sleeve 40 has grooves 44 in which the O-rings 55 can be placed (see in particular FIGS. 2 and 3). Such static seals can also be provided on the other seal supports.

In order to protect the sealing system 100 in addition from corrosion, there is furthermore provided a sacrificial anode 56, which is arranged bordering on the sealing system 100 and the contacting sleeve 40. Furthermore, FIG. 1 shows that the sacrificial anode 56 is carried by a spacing element 58 (see FIG. 3), which is dimensioned such that a distance between the spacing element 58 and the rotor blade 4 is minimized. In this way, it can be assured that the contacting sleeve 40 has only a limited axial play, which in turn ensures that unwanted axial displacements and thus a worsening of the sealing properties is prevented. In particular, this ensures the preferred redundancy for the contacting sleeve which is held by a press-fit.

In order to keep wear and tear on the sealing lips 34 and the contacting sleeve 40 as low as possible, the most friction-free contacting condition between the sealing lip 34 and the mating surface 42 should be created. For this, the sealing lips 34 or in general the seal element 30 can be made from a material which contains a solid lubricant in embedded form, or which are made from a solid lubricant material.

It is likewise possible to provide the sealing lips 34 with a solid lubricant coating. In order to support this lubricating ability and/or to achieve a greater freedom in the choice of material of the sealing lips 34, yet at the same time create the most friction-free abutment situation possible, it is disclosed to introduce lubricant in addition into the sealing system. For this, in the exemplary embodiment shown, lubricant is introduced into a chamber in the seal support 20. The chamber here can be configured as an independent cutout.

In the exemplary embodiment shown in FIGS. 1-3, a cutout is already present on the seal support 20, namely, the sealing lip receiving cutout 22. This serves as the chamber in the exemplary embodiment shown and can be used for being filled with lubricant in order to lessen the friction of the sealing lips 34 against the mating surface 42.

In order to introduce lubricant into the chamber 22-2 and 22-3, radially arranged through-boreholes 26-2 and 26-3 are therefore provided furthermore in the seal supports 20-2 and 20-3, as shown in FIGS. 2 and 3, connecting the chambers 22-2 and 22-3 fluidically to an outer circumference. In order to supply the chamber 22-4 with lubricant, an angled through-borehole 46 is provided furthermore in the contacting sleeve 40 in the exemplary embodiment shown, as shown in FIG. 3, serving for introducing lubricant into the chamber 24-4.

The lubricant can serve on the one hand to equalize a water pressure acting on the sealing lips 34 and at the same time to ensure that a sufficient lubrication is provided between the mating surface 42 and the sealing lip 34. On the other hand, the lubricant can fill up the sealing system 100 entirely so that all cavities are filled with lubricant. In this way, it can be assured that the lubricant applies the same pressure to the sealing lips 34 on both sides and at the same time prevents water from being able to get into the sealing system 100 since all the cavities are filled with lubricant. In order to penetrate into such a sealing system 100, the water would also still have to displace the lubricant from the sealing system 100 in addition to overcoming the sealing lips 34.

It is especially preferable here to provide not only a single through-borehole 26 or 46 in the respective seal support 20 or the contacting sleeve 40, but rather to provide two through-boreholes in each case, arranged offset by 180° on the seal support 20 and the contacting sleeve 40 so that lubricant can be distributed free of bubbles and evenly in the sealing system 100.

Figure 4:
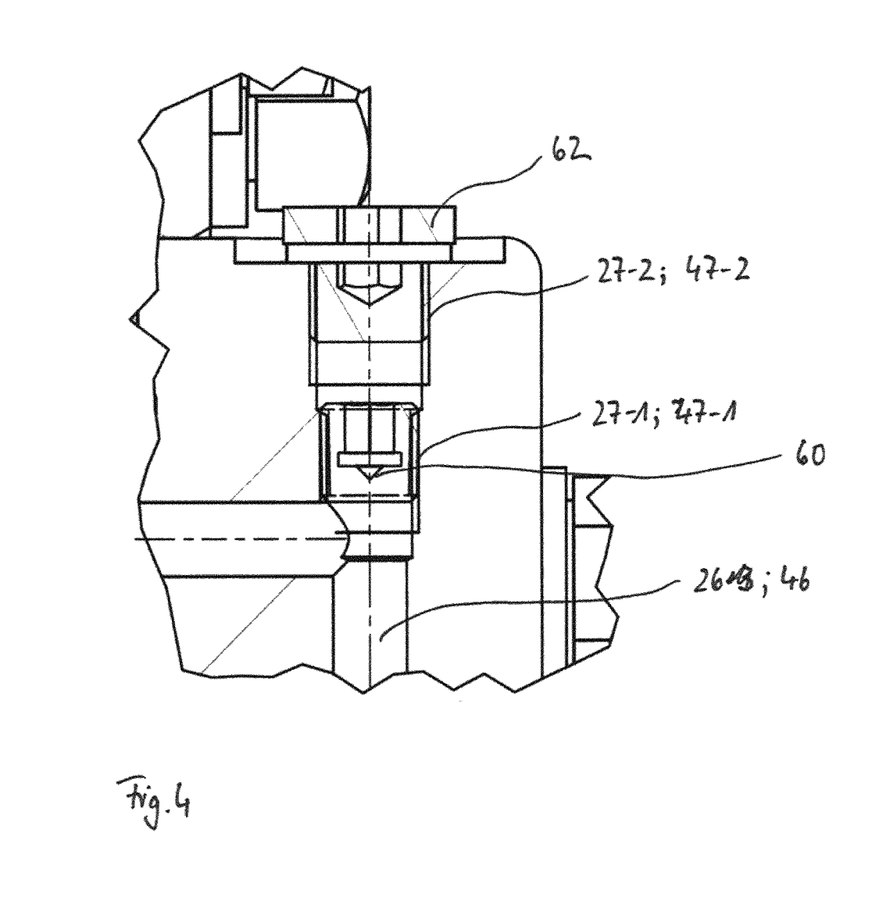
FIG. 4: a fourth cross sectional view through the sealing system of FIG. 1.

In order to close the through-boreholes 26, 46 fluid-tight against the water surroundings after introducing the lubricant, the through-boreholes 26, 46 furthermore have, as shown in FIG. 4, a first thread 27-1, 47-1 and a second thread 27-2, 47-2, which are of different size. Thus, the first thread 27-1, 47-1 is smaller in diameter than the second thread 27-2, 47-2. In the first thread 27-1, 47-1, which is arranged radially further inwardly, a, preferably conical, grub screw 60 can be tightly screwed in, while a closure plug 62, which can be screwed in, is screwed tightly into the outer thread 27-2, 47-2. Also in this way a redundancy can be created, ensuring that water cannot get into the sealing system 100 even under the most unfavorable conditions.

Yet the through-boreholes 26, 46 can also be used to also check the sealing system 100 in terms of its tightness. For this, a vacuum can be applied in each case to the through-boreholes 26, 46, with which a check is made as to whether the sealing lips 34 lie tightly. This makes it possible that a check can be made as to whether the sealing system 100 was properly installed, even after the installation of the sealing system 100 and prior to admitting water to the underwater turbine. Instead of a vacuum, a test fluid can also be used of course, being introduced into the sealing system 100 with a certain pressure.

Besides the leak testing for the dynamic seal elements 34, the static seal 54, 55 can also be subjected to leak testing. For this, the sealing system 100 has boreholes 28 and 48 in the fastening seal ring 20-4 and the contacting sleeve 40, as shown in FIG. 2, which are configured at an angle and which open out in the case of the fastening seal support 20-4 at an end face 29 between the two static seals 54-1 54-2. In the case of the contacting sleeve 40, on the other hand, the through-borehole 48 opens out in an inner lateral surface 49. A test fluid can likewise be introduced via the through-boreholes 28 and 48, or a vacuum can be applied, in order to check the tightness of the static seals 54, 55.

Furthermore, a lubricant can also be introduced in the through-borehole 48 which is formed in the contacting sleeve 40, which lubricant is distributed on the contact surface between the contacting sleeve 40 and the shaft 2 so that the contacting sleeve 40 is axially displaceable. This is especially advantageous when the contacting sleeve 40 is to be disassembled from the shaft 2, or it is to be moved in its axial position in order to prevent formation of grooves on account of the contact pressure between the sealing lips 34 and the mating surface 42.

Furthermore, FIG. 1-3 show that each time a ring-shaped axially protruding projection 64 is provided on adjacent seal supports 20, which is received in a complementary ring-shaped notch 66. These serve for the self-centering of the seal supports 20.

On the whole, the wear and tear in the sealing system can be significantly reduced by providing lubricant in the sealing system 100 and at the same time a better sealing against the sea water can be achieved.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sealing systems.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMERAL LIST

2 Rotor blade shaft
4 Rotor blades

6 Rotor hub
8 Bearing units
20 Seal support
21 Seal body receiving cutouts
22 Sealing lip receiving cutout; chamber
23 Fastening borehole
24 Thread
25 Ring-shaped groove in seal support
26 Through-borehole
27 Thread in through-borehole
28 Through-borehole
29 End face
30 Seal element
32 Seal body
34 Sealing lip
36 Running surface
37, 38 Support element
40 Contacting sleeve
42 Mating surface
44 Grooves
46 Through-borehole in contacting sleeve
47 Thread in through-borehole
48 Through-borehole
49 Inner lateral surface
50 Fastening means
52 Forcing screw
54 Static seal
55 Static seal
56 Sacrificial anode
58 Spacing element
60 Grub screw
62 Plug
64 Ring-shaped projection
66 Ring-shaped notch
100 Sealing system

What is claimed is:

1. A sealing system for sealing a rotatable shaft of an underwater turbine against an entry of seawater, comprising:
a first seal support and a second seal support arranged axially adjacent to the first seal support along the shaft,
a first seal element supported by the first seal support and a second seal element supported by the second seal support, the first and second seal elements each comprising an annular seal body and a lip extending from the seal body to a sealing surface on or rotationally fixed to the rotatable shaft, and
at least one lubricant-filled chamber between the first and/or second seal supports and the shaft,
wherein each of the first and second seal supports includes, at a radially outer region of the respective one of the seal supports, a plurality of circumferentially spaced boreholes, and
wherein an outer diameter of the first seal support is greater than an outer diameter of the second seal support such that the boreholes of the first seal support are not covered by the second seal support.

2. The sealing system according to claim 1,
wherein the first seal support has a through-borehole fluidically connected to the chamber.

3. The sealing system according to claim 2,
wherein the through-borehole extends radially and includes a radially outermost first threaded portion and a second threaded portion radially adjacent to the first threaded portion, and
wherein a diameter of the first threaded portion is greater than a diameter of the second threaded portion.

4. The sealing system according to claim 1,
wherein a first axial direction along the shaft is a forward direction and a second axial direction opposite the first axial direction is a rearward direction,
wherein the first seal support includes a forward surface and a cutout in the forward surface in which the seal body of the first seal element is mounted and a projection extending forward from a radially inner portion of the cutout having a radially outer conical surface extending between a portion of the lip of the first seal element and the rotatable shaft, and
wherein the second seal support includes a rear surface abutting the forward surface of the first seal support, a projection extending rearward and supporting a radially inner portion of the seal body of the first seal element, and a cutout facing the lip of the first seal element and, with the lip of the first seal element, at least partially defining a first one of the at least one lubricant-filled chamber.

5. The sealing system according to claim 4,
wherein the second seal support includes a forward surface and a cutout in the forward surface of the second seal support in which the second seal body is mounted and a projection extending forward from a radially inner portion of the cutout of the second seal support having a radially outer conical surface extending between a portion of the lip of the second seal element and the rotatable shaft.

6. The sealing system according to claim 5,
including a third seal support having a rear surface abutting the forward surface of the second seal support and a projection extending rearward and supporting a radially inner portion of the seal body of the second seal element and a cutout facing the lip of the second seal element and defining with the lip of the second seal element a second one of the at least one lubricant-filled chamber.

7. The sealing system according to claim 6,
wherein a portion of the second seal support axially overlies a portion of the first seal support.

8. The sealing system according to claim 7,
wherein the plurality of circumferentially spaced boreholes are each threaded and configured to receive a threaded fastener.

9. The sealing system according claim 6,
wherein the third seal support includes an annular groove in a radially inwardly facing surface and an O-ring in the groove.

10. The sealing system according to claim 6,
including a fourth seal support having a rear surface configured to be mounted against a housing or bearing ring surrounding the shaft, the fourth seal support including an annular groove in the rear surface and an O-ring in the annular groove,
wherein the fourth seal support includes a first borehole portion extending radially from a radially outer surface of the fourth seal support to a location inside the fourth seal support and a second borehole portion extending axially from the location to an opening at the rear surface of the fourth seal support, and
wherein the opening at the rear surface of the fourth seal support is located radially inward of the annular groove in the rear surface of the fourth seal support.

11. The sealing system according claim 10,
wherein the third seal support is a forwardmost seal support of the sealing system.

12. The sealing system according to claim 11,
wherein the first seal support and the second seal support are located between the fourth seal support and the third seal support.

13. The sealing system according to 11,
wherein an outer diameter of the fourth seal support is greater than the outer diameter of the first seal support, and
wherein the outer diameter of the second seal support is greater than an outer diameter of the third seal support.

14. The sealing system according to claim 11,
including a contact sleeve mounted on the shaft and including the surface rotationally fixed relative to the shaft,
wherein the contact sleeve includes an annular groove on a radially inner surface and an O-ring in the groove on the radially inner surface.

15. The sealing system according to claim 14,
wherein the contact sleeve includes a borehole having an axial borehole portion and a radial borehole portion,
wherein the radial borehole portion extends from the axial borehole portion to the radial inner surface of the contact sleeve axially rearward of the annular groove on the radially inner surface of the contact sleeve, and
wherein the axial borehole portion has a forwardmost portion having a first diameter, a central portion having a diameter less than the first diameter and a rearwardmost portion having a third diameter less than the second diameter.

16. The sealing system according to claim 15,
wherein the contacting sleeve is press-fitted onto the rotatable component.

17. The sealing system according to claim 1,
wherein a first one of the at least one lubricant filled chamber is at least partially defined by a radially outer surface of the lip of the first seal element and by the second seal support.

18. The sealing system according to claim 1,
wherein the lip of the first seal support extends axially between the second seal support and the shaft.

19. The sealing system according to claim 1,
wherein a portion of the second seal support extends axially between the seal body of the first seal element and the lip of the first seal element.

* * * * *